R. F. KREITER, E. S. POST, A. L. ROCO & M. E. LAYNE.
MACHINE FOR MAKING WATER AND OIL SCREENS.
APPLICATION FILED OCT. 15, 1908.

1,079,417.

Patented Nov. 25, 1913.

WITNESSES:

INVENTORS

Atty

R. F. KREITER, E. S. POST, A. L. ROCO & M. E. LAYNE.
MACHINE FOR MAKING WATER AND OIL SCREENS.
APPLICATION FILED OCT. 15, 1908.
1,079,417.
Patented Nov. 25, 1913.
6 SHEETS—SHEET 2.
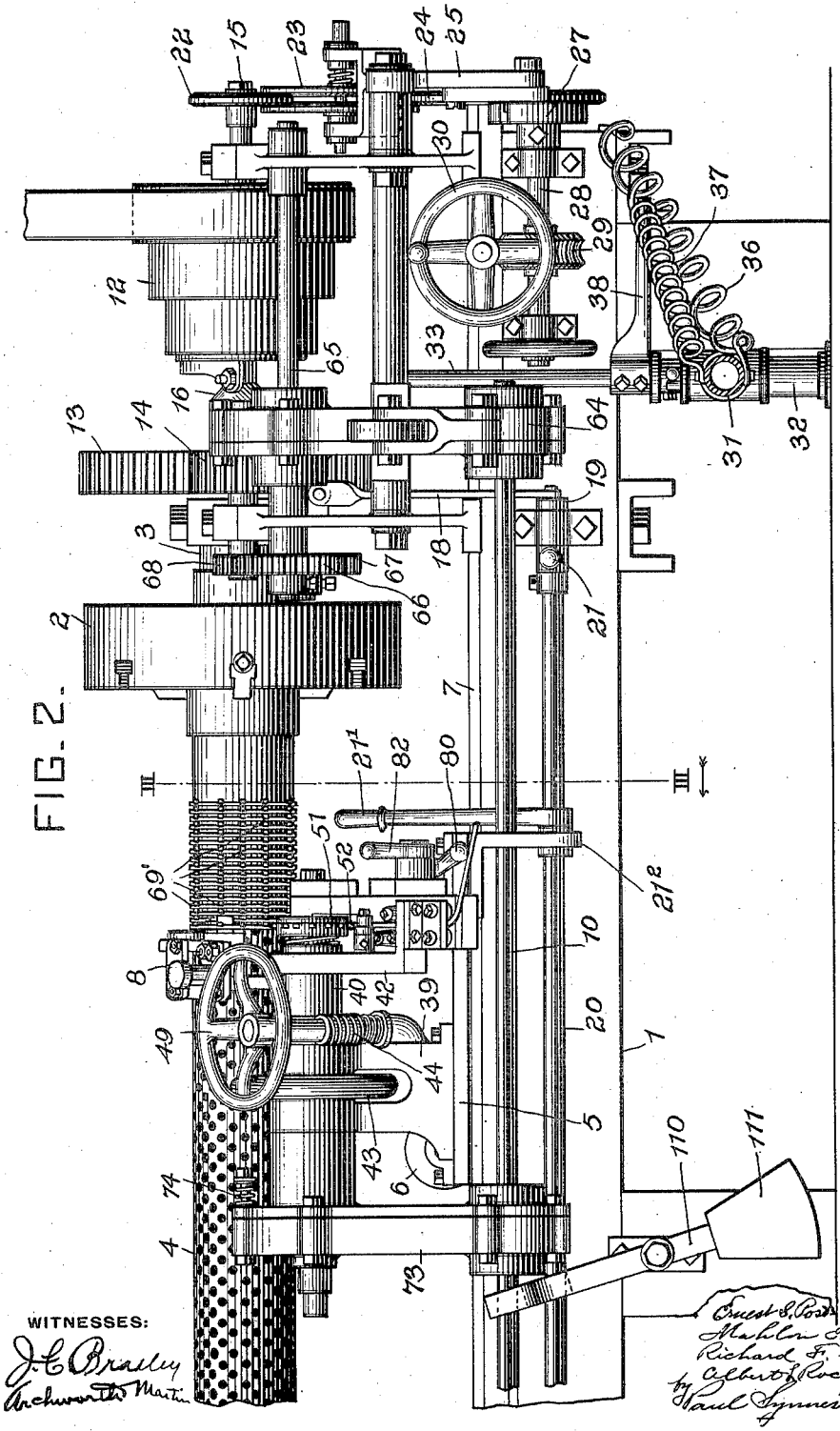

R. F. KREITER, E. S. POST, A. L. ROCO & M. E. LAYNE.
MACHINE FOR MAKING WATER AND OIL SCREENS.
APPLICATION FILED OCT. 15, 1908.
1,079,417.
Patented Nov. 25, 1913.
6 SHEETS—SHEET 3.
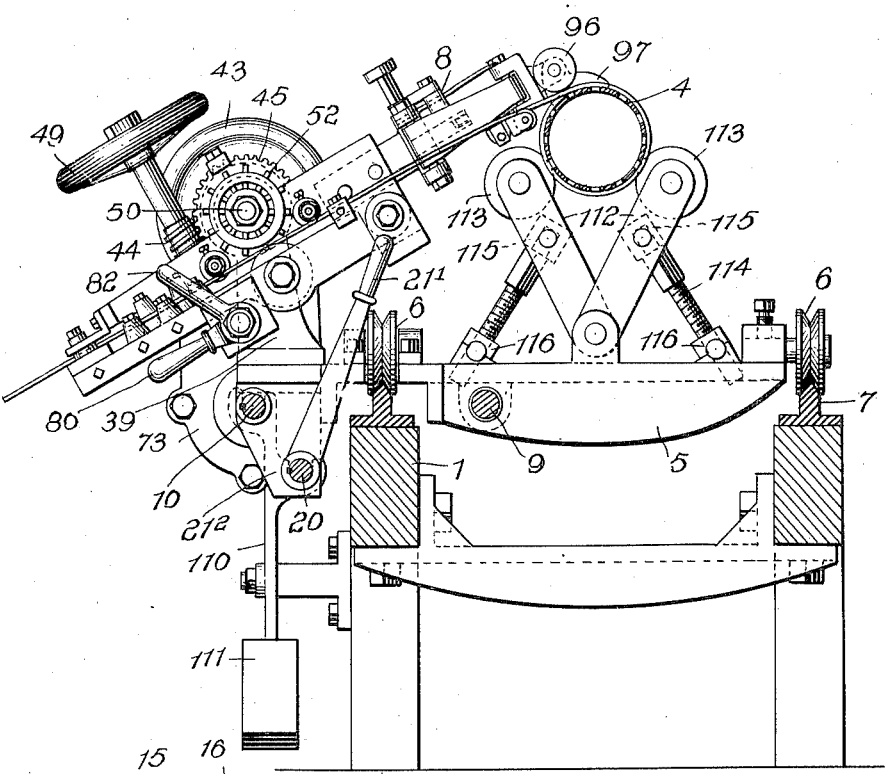
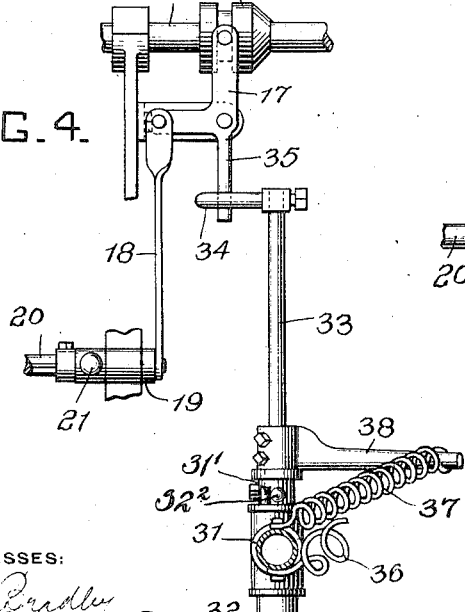
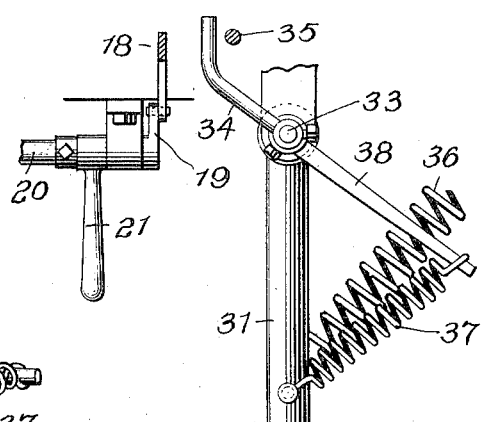

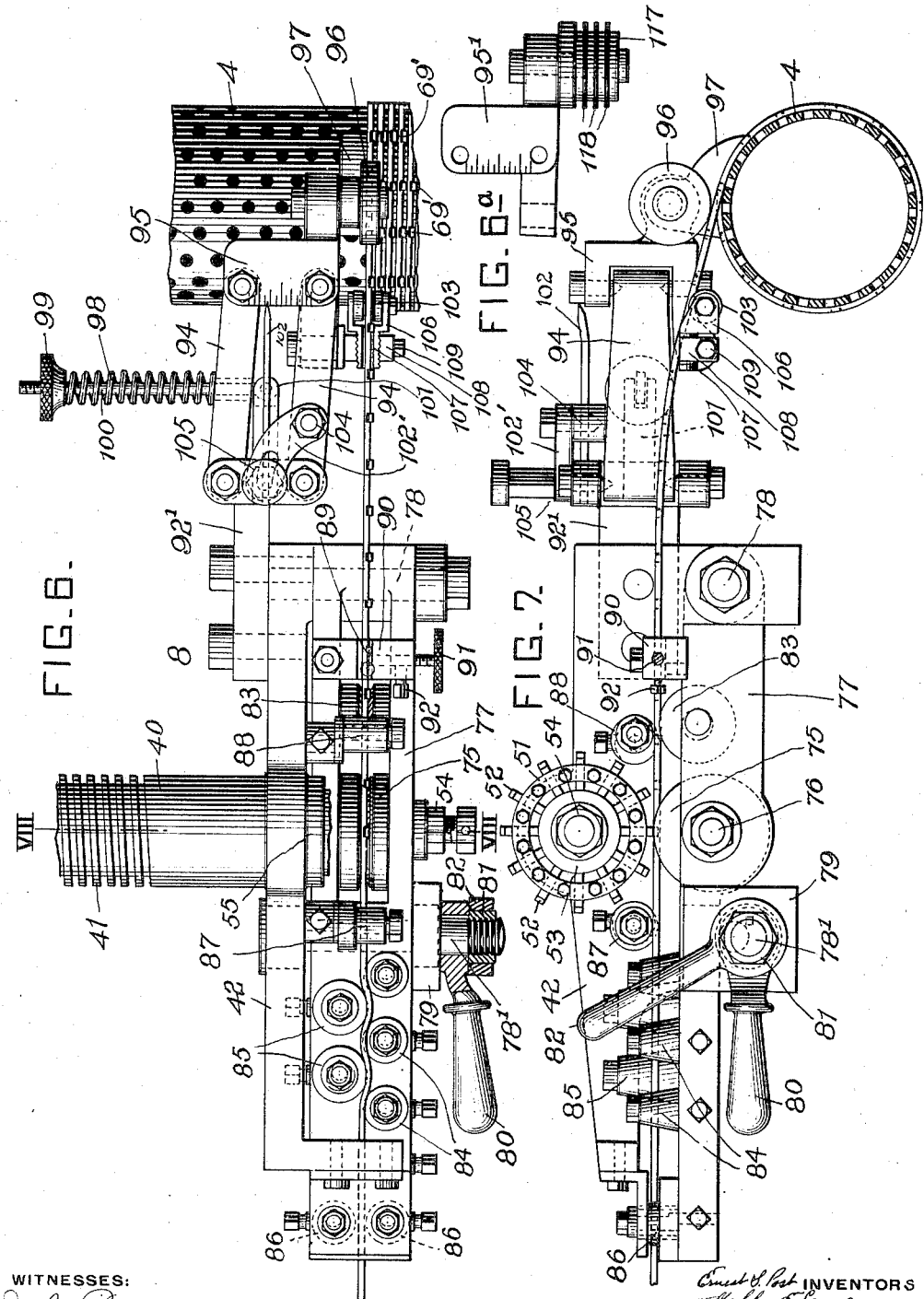

R. F. KREITER, E. S. POST, A. L. ROCO & M. E. LAYNE.
MACHINE FOR MAKING WATER AND OIL SCREENS.
APPLICATION FILED OCT. 15, 1908.
1,079,417.
Patented Nov. 25, 1913.
6 SHEETS—SHEET 5.
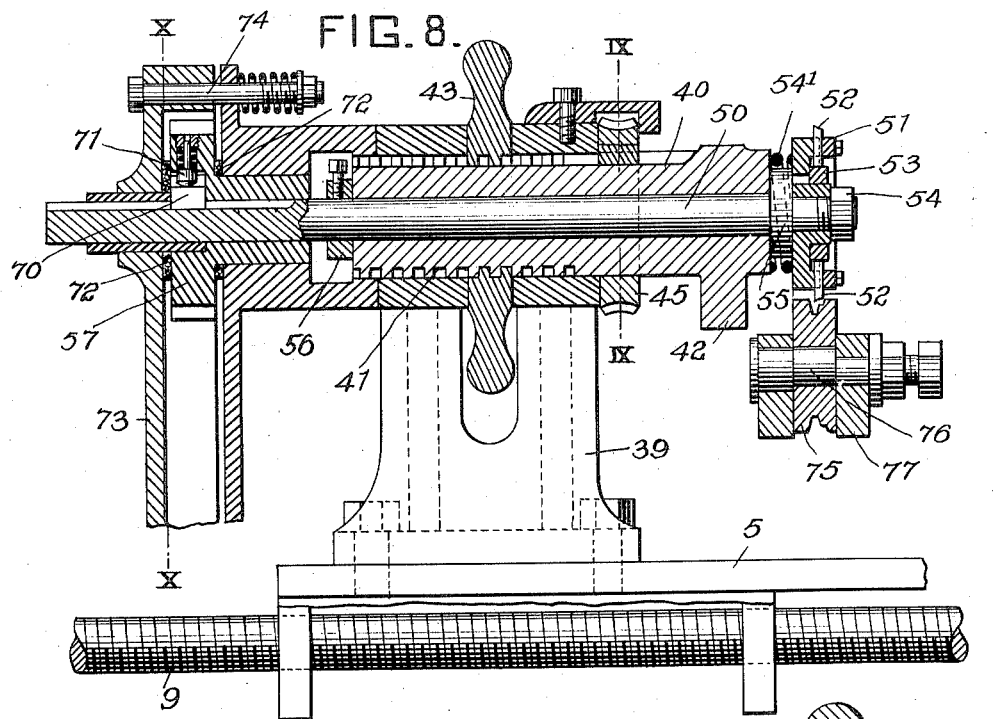
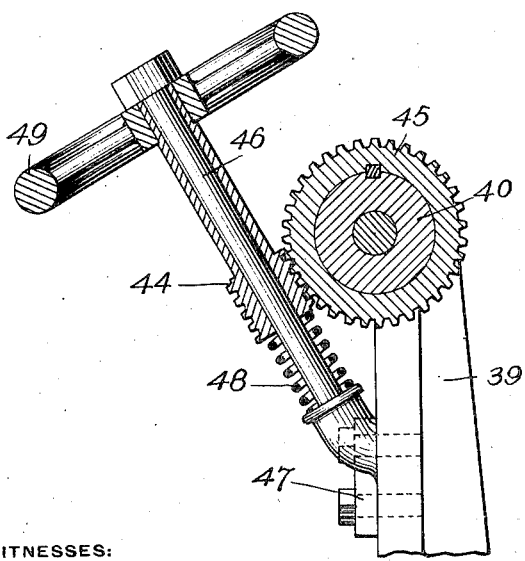
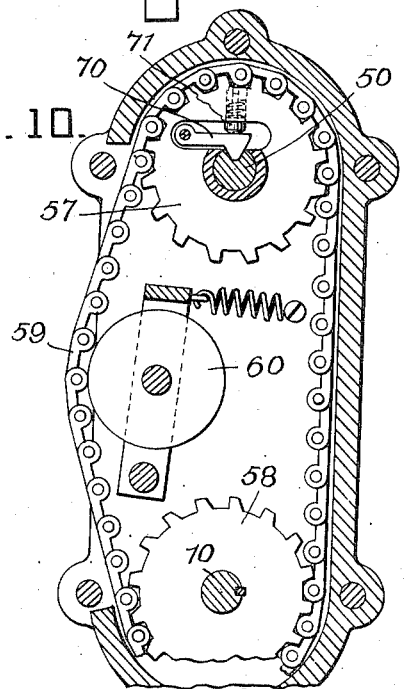
WITNESSES:
INVENTORS
Atty R. F. KREITER, E. S. POST, A. L. ROCO & M. E. LAYNE.
MACHINE FOR MAKING WATER AND OIL SCREENS.
APPLICATION FILED OCT. 15, 1908.
1,079,417.
Patented Nov. 25, 1913.
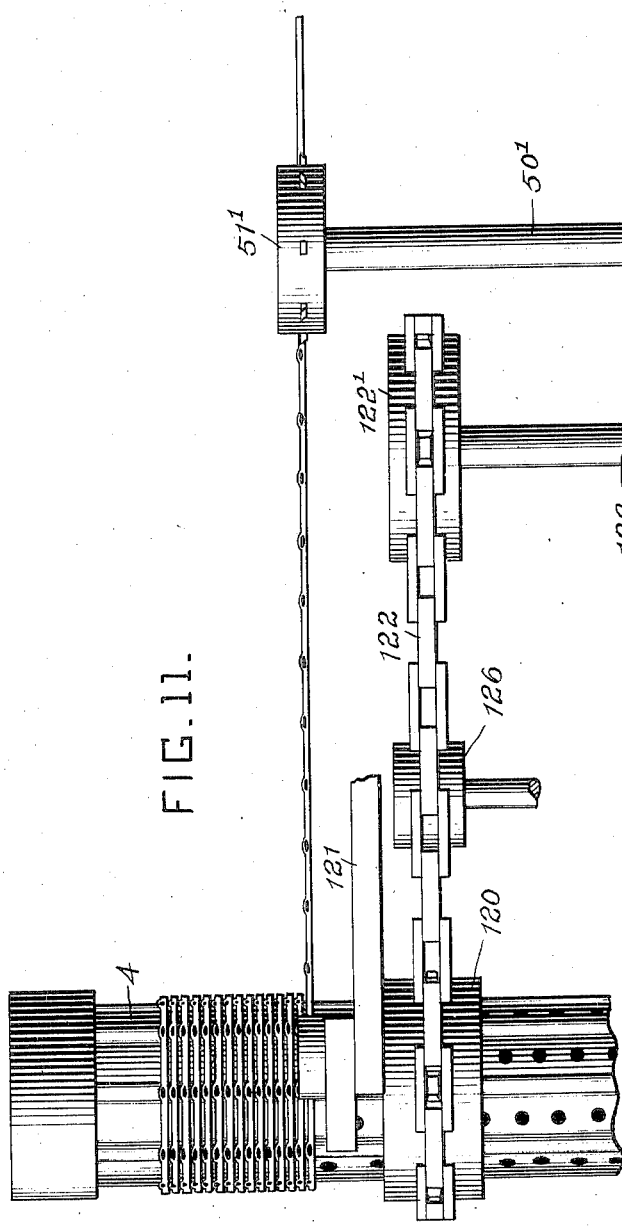
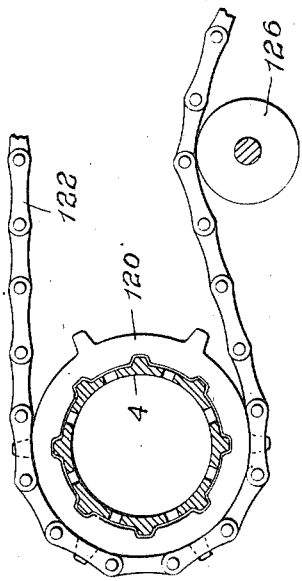

UNITED STATES PATENT OFFICE.

RICHARD F. KREITER, ERNEST S. POST, ALBERT L. ROCO, AND MAHLON E. LAYNE, OF HOUSTON, TEXAS; SAID KREITER, ROCO, AND POST ASSIGNORS TO SAID LAYNE.

MACHINE FOR MAKING WATER AND OIL SCREENS.

1,079,417.   Specification of Letters Patent.   Patented Nov. 25, 1913.

Application filed October 15, 1908. Serial No. 457,966.

*To all whom it may concern:*

Be it known that we, RICHARD F. KREITER, ERNEST S. POST, ALBERT L. ROCO, and MAHLON E. LAYNE, citizens of the United States, residing at Houston, in the county of Harris and State of Texas, have invented certain new and useful Improvements in Machines for Making Water and Oil Screens, of which the following is a specification.

The invention relates to a machine for making water and oil screens and has for its principal objects: the provision of a mechanism for providing lugs on the screening wire and winding such wire so that the lugs come in uniform rows upon the finished screen; the provision of improved means for securing exact and uniform spacing of the wire on the pipe on which it is wound; the provision of improved means for securing the proper engagement of the successive coils of wire and for giving a proper longitudinal feed to the wire guiding mechanism; the provision of improved means for automatically throwing out the drive of the machine in case of accident to or stoppage of the wire as it is unreeled; the provision of improved means for supporting the operating rod for the punching mechanism; and the provision of means whereby the operating parts of the punching and guiding mechanism may be easily adjusted with respect to the body of the machine independent of the feed screw. Certain embodiments of the invention are illustrated in the accompanying drawings, wherein:—

Figure 2 is a front elevation of the machine,

Figure 1:
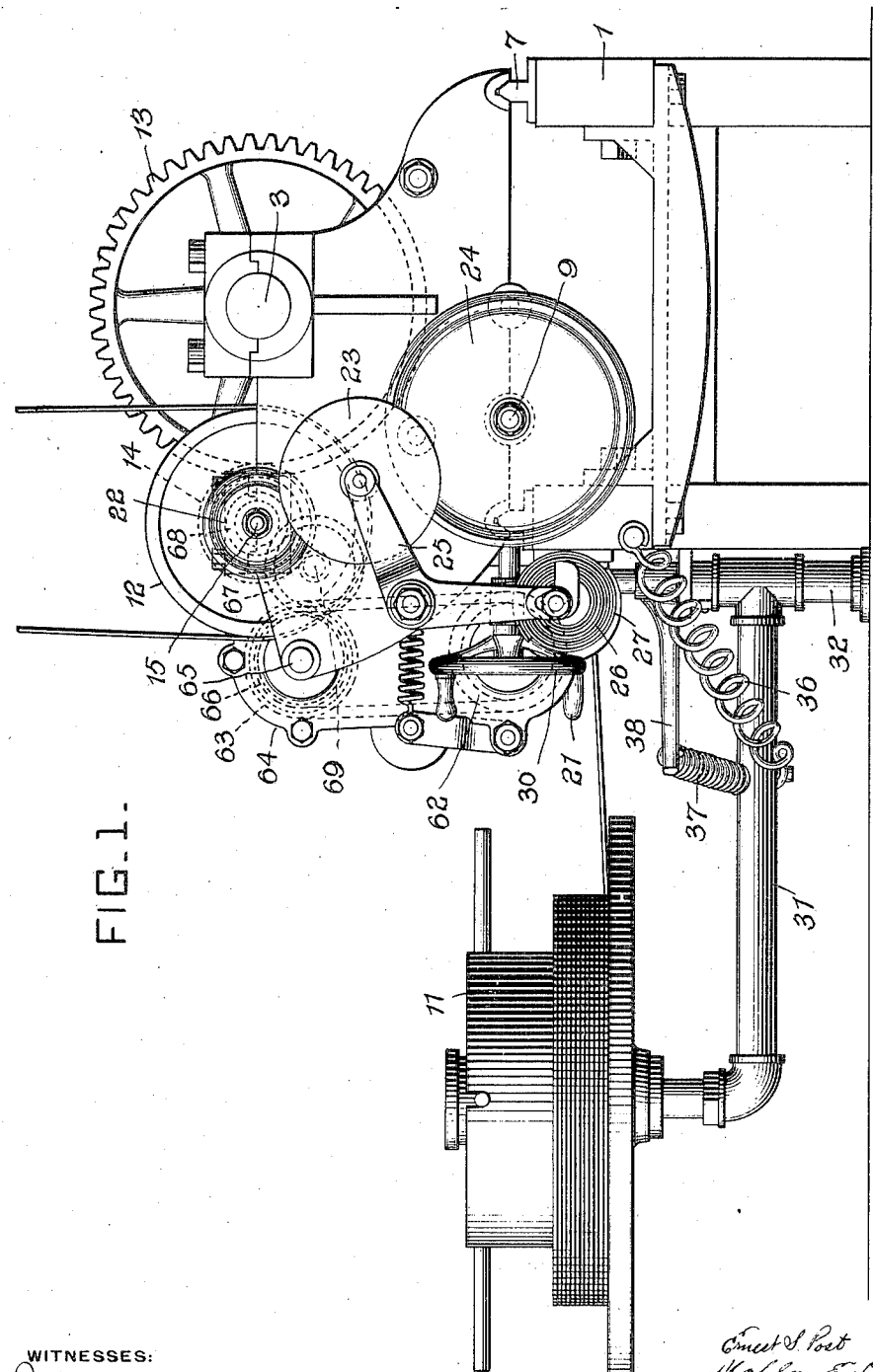
Figure 1 is an end elevation of the machine.

Figure 3 is a section on the line III—III of Figure 2, looking in the direction of the arrow, Figures 4 and 5 are front elevation and plan views respectively of the clutch shifting mechanism, Figures 6 and 7 are detail plan and side elevations respectively of the mechanism for guiding the wire onto the pipe and spacing it, Figure 6ª is a detail plan view of a modified form of wire engaging means, which may be applied to the construction shown in Figures 6 and 7, Figure 8 is a longitudinal section through the punching device, taken on the line VIII—VIII of Figure 6, Figure 9 is a section on the line IX—IX of Figure 8, Figure 10 is a section on the line X—X of Figure 8, Figure 11 is a diagrammatic plan view showing a modified driving means for the punching mechanism, and Figure 12 is a partial end view of the device shown in Figure 11.

Generally stated the purpose of the machine is the formation of a wire screening surface about a perforated pipe. This is accomplished by a lathe like structure in which the pipe is mounted to rotate, which machine carries a mechanism for guiding the wire to the pipe, and punching spacing lugs thereon as the wire is drawn through the mechanism on its way to the pipe. In some cases, particularly in the formation of water screens, the mechanism is simplified by the omission of the means for punching the lugs on the wire.

Referring first to the general arrangement of parts as shown in Figures 1, 2, and 3, 1 is the body of the lathe which may be of any preferred form, 2 is the chuck which is mounted upon the lathe spindle 3 and engages the end of the pipe 4 upon which the wire is wound, 5 is the lathe carriage (Figure 3) mounted upon the wheels 6 running on the tracks 7, 8 is the mechanism for guiding the wire upon the pipe 4, which mechanism is mounted upon the carriage 5 and is provided with the wire punching means described in full hereafter, 9 is the feed screw (Figure 3) for carrying the carriage along the bed as the winding progresses, 10 is the drive rod from which the punching mechanism on the guide 8 is driven, 11 is the reel from which the wire to the guiding mechanism 8 is supplied, and 12 is the cone pulley from which all the operating parts are driven.

The driving connections between the hollow cone pulley 12 and the chuck 2 comprise the spur gears 13 and 14 mounted respectively on the spindle 3 carrying the chuck and the spindle 15 on which the cone pulley is mounted (Figure 1). The cone pulley is loose on its spindle and is clutched thereto by an expansible ring (not shown) which is keyed to the spindle. This ring is expanded by means of the cone 16 (Figure 4) loosely mounted on the spindle, a spring (not shown) normally holding the cone 16 to the right so that the clutching ring is expanded to secure the cone pulley to the spindle 15. The cone 16 may be thrown out of operative engagement by means of the link connections shown in Figures 4 and 5, which link connections include the bell crank 17, the link 18, the crank 19 on the shaft 20, and the hand lever 21 for rotating the shaft 20. This shaft 20 is also operable by the lever 21' slidably keyed to the shaft and mounted on a bracket 21² secured to the carriage 5. These connections are also arranged to be operated automatically from the reel in a manner to be more particularly described hereafter. The feed screw 9 is operated from the cone pulley shaft 15 by means of the friction gear members 22, 23, and 24 shown in Figures 1 and 2, the members 22 and 24 being secured respectively to the ends of the shaft 15 and the screw 9, while the intermediate member 23 is mounted adjustably upon the bell-crank lever 25. The member 23 comprises a pair of parallel spring-held disks which fit over the edges of the members 22 and 24. In order that the member 23 may be adjusted and the speed of rotation of feed screw 9 thereby changed, the lower end of the bell-crank lever 25 is provided with an inwardly projecting pin (not shown) engaging a spiral groove 26 in the end of disk 27, the disk being mounted upon the shaft 28 provided with the worm-wheel 29 engaging a worm on the shaft of the hand-wheel 30.

The wire employed in the formation of the screening surface upon the pipe, is preferably of the keystone or wedge shape shown in the Patent No. 820,507, M. E. Layne and this wire is supplied to the machine from the reel 11 shown in Figure 1. In the winding operation the wire, which is secured to the pipe, is drawn from the reel and through the guide mechanism 8 by means of the rotation of the pipe to which the end of the wire is secured, before the winding operation commences. During the unwinding of the wire from the reel 11, it not unfrequently happens that the wire snarls and catches, and if the operating mechanism is not immediately thrown out of gear a breakage occurs. In order to prevent such breakage an automatic throw-out device has been provided which constitutes one of the features of the invention. This mechanism includes the arm 31 carrying the reel 11, and pivotally mounted on the vertical rod 32, and the connections shown in Figures 4 and 5. As here shown, an extension 33 of the rod 32 is swiveled thereon and is provided with a projecting arm 34 in position to engage an extension 35 on the bell crank lever 17 which operates the clutch 16. The parts are normally held out of operative position by means of the spring 36 secured at one end to the frame and at the other end to the swinging arm 31 which carries the reel. The rod 33 is yieldingly connected to the arm 31 by means of a spring 37, and an arm 38 which is bolted to the rod 33. When the wire catches and an unusual strain is placed thereon, the reel is pulled laterally against the resistance of the spring 36. This movement causes the spring 37 to move the arm 38, so that when the rod 33 is turned a sufficient distance the arm 34 engages the lever 35 to operate the cone 16. The provision of the lost motion between the arm 34 and lever 35 permits of a certain amount of movement of the reel and its arm 31 without actuating the clutch mechanism, it not being necessary to throw out the operating mechanism until the strain on the wire approaches the breaking point. A pin 31' mounted to move with the arm 31 engages a pin 32² on the rod 33 and serves to swing the rod 33 and lever 38 back to normal position when the arm 31 moves back.

The mechanism for guiding the wire to the pipe and placing it thereon, and for punching it when the screen is to be used for oil, constitutes an important feature of the invention and is shown in detail in Figures 6 to 10 inclusive, to which attention is directed. The entire mechanism is mounted upon a pedestal 39 (Figure 8), which pedestal is bolted to the carriage 5 of the lathe, fed longitudinally of the pipe as the winding progresses by means of the feed screw 9. The upper portion of the pedestal 39 is recessed as indicated in Figure 8, and in this recess is mounted a casting 40, the spindle portion of which is screw threaded at 41, and the body portion thereof comprises a flat plate 42 upon which the punching roll and certain other of the operating parts are mounted. The screw threads 41 of the spindle are engaged by the hand wheel 43 fitting in a recess in the pedestal 39, and by the operation of this hand-wheel the casting 40 with the operating parts carried thereby may be moved longitudinally of the machine independent of the feed screw 9. The casting 40 may be also rotarily adjusted by means of the worm 44 (Figure 9) engaging the worm wheel 45 slidingly keyed to the casting 40. The worm 44 is slidingly mounted on the rod 46 supported on the frame 39 by means of the bracket 47. The worm 44 is yieldingly held in the position shown in Figure 9 by means of the spring 48, and is operated to rotate the worm-wheel 45 by means of the hand-wheel 49 keyed to the shank of the worm. The spring 48 permits of a slight rotative or oscillatory movement of the worm wheel 45, and its casting during the operation of the machine, which freedom of motion is desirable in order that the guide mechanism resting upon the pipe, and carried by the casting 40 may follow the irregularities of the pipe without binding and may constantly engage the pipe with a yielding pressure.

Extending longitudinally through the casting 40 is the drive shaft 50 for the punching roller 51. The punching roller is provided with a plurality of punches 52 extending through the flange of the roll and bearing at their rear ends against a ring 53. The punching roll is held in position upon the drive shaft 50 by means of the nut 54, and the shaft 50 is kept from longitudinal movement with respect to the casting 40 by means of the collars 55 and 56, the collar 56 being secured adjustably to the shaft 50 by means of the set screw shown. In order that the punches 52 may always run in the same plane and any lost motion be taken up, the spring 54' is provided intermediate the end of the casting 40 and the punching roll 51. The shaft 50 is slidingly keyed to the sprocket wheel 57, which is driven from the sprocket wheel 58 by means of the chain 59 (Figure 10), the chain normally being held tight by the spring held idler 60. The sprocket 58 is slidingly keyed to the shaft 10 which extends throughout the length of the lathe bed (Figure 2). This shaft 10 is provided at its right hand end with a sprocket wheel 62 driven by a chain from the sprocket 63 (Figure 1) inclosed by the gear casing 64. The shaft 65 which carries the sprocket 63, is driven by means of the spur gears 66, 67 and 68, mounted respectively on the shafts 65, 69 and 15 (Figures 1 and 2). In this manner a positive drive is given to the punching roll 51, and by rotating the parts at the proper speed, the punch marks constituting the rows 69' are made to come in alinement. This is desirable, as the successive coils are pressed in tightly against each other by a mechanism to be hereafter described, and when the spacing spurs come opposite, the wire is supported at the point of pressure by the preceding spurs, and there is no opportunity for the spur to bend the coil against which it is pressed, as is the case where a spur comes opposite an unsupported portion of the wire. If it is desired that the punches and wire move at the same speed, and the alinement of the punch marks on the finished screen be maintained, the distance of the punches apart must be an exact divisor of the circumference of the finished screen. While by the foregoing arrangement the speed of travel of the punch points 52 is made theoretically the same as that of the wire as it is passing the punches, yet in fact, due to irregularities of the pipe, the speed of travel of the wire differs slightly from that of the punch points, and unless provision were made to avoid it, recesses of undue length would be made in the wire, instead of the short punch marks. The means whereby this is accomplished is shown in Figure 10, and comprises the key 70 swingingly mounted upon the sprocket 57, and provided with the wedge-shaped nose shown, fitting into a correspondingly shaped groove in the shaft 50. The key is held yieldingly in place by means of the spring-pressed plunger 71. This arrangement permits the sprocket 57 to rotate slightly with respect to the shaft 50, so that the speed of such shaft 50 may be slightly accelerated or retarded to accommodate the speed of travel of the punch points to that of the wire without affecting the speed of rotation of the sprocket 57. Fiber washers 72 are provided on either side of the sprocket 57, and are held in tight engagement therewith by means of the casing 73, spring held by means of the bolt 74.

In order to support the wire while it is being punched, the roll 75 is provided immediately below the punching roll 51. This roll is mounted for adjustment upon the eccentric pin 76, which pin is mounted in the frame 77 pivotally supported at its front end upon the bolt 78. The rear portion of the frame 77 is supported by means of the eccentric bolt 78' having its end pivoted in the bracket 79 constituting a portion of the plate 42, and having its central eccentric portion bearing on the under side of the frame 77. The bolt 78' may be turned to either raise or lower the frame 77 by means of the handle 80 keyed to such bolt. The bolt is held in any desired position by means of the nut 81. which may be operated by means of the wrench 82. The frame 77 also carries the grooved guide roller 83, the cone tension rolls 84 and 85, and the leading in rolls 86. Guide rolls 87 and 88 for engaging the top of the wire are also mounted upon the plate 42. The making of the frame 77 adjustable with respect to the plate 42 facilitates the passing of the wire between the various rolls before the winding operation commences. At such time the handle 80 is rotated so that the frame 77 occupies its lowermost position. In order to insure a uniform size in the spurs punched on the wire and consequent uniform spacing of the wire upon the pipe, the cutter member 89 is provided. This cutter member is merely the shank of a screw threaded through a bracket 90 through which the wire passes and having a head 91. The end of the shank is cut off square and hardened so that the sharp edge acts as a cutter or scraper which shears off the tops of the lugs previously formed, thus bringing all to the same height. The shank is held in adjusted position by means of the set screw 92, and when dulled the end of the shank can readily be removed and sharpened by grinding it down slightly.

Bolted to the outer end of the plate 42 is the bracket 92' which bracket is forked as indicated in Figure 7, and carries pivotally supported on the cone pointed screws, the links 94, which links are in turn engaged at their outer ends by the cone pointed screws carried by the block 95. The block 95 is provided with a roller 96 adapted to engage the top of the wire as it passes onto the pipe, and with a shoe 97 adapted to bear on the top of the pipe and press with its side against the last coil of wire. This shoe 97 is held in yielding engagement with the wire by means of the spring 98, which engages the side of one of the bars 94, and at its other end engages the nut 99 carried by the rod 100. This rod 100 passes through a slot in the member 94 and is pivotally engaged at its inner end with a post 101 integral with the bracket 92'. By adjusting the thumb screw 99 the amount of pressure with which the shoe 97 engages the side of the wire may be regulated. Gage marks are provided upon the top of the block 95 and a pointer 102 registering therewith is mounted upon the bracket 92'. By this means the amount of pressure which is being exerted by the block or shoe 97 may be gaged. It will be seen that by the use of the two links 94, the member 95 is always maintained in parallelism with the axis of the pipe, and the angle of the side of the shoe 97 with respect to the side of the wire never varies, regardless of the longitudinal movement of such shoe 97. If desired the links 94 may be locked in fixed position by means of the diagonal connecting link 102' which is slotted at one end and secured to one of the links 94 and the top of the bracket 92' by the studs 104 and 105 respectively. Immediately to the rear of the roll 96 is a grooved guide roll 103 for twisting the wire slightly about its axis when desired. This roller is carried by a forked member 106 provided with a screw threaded shank 107 fitting into split block 108, which split block is carried by the block 95 and is provided with a clamping stud 109.

Another feature of the invention consists in the means for supporting the long rods 10 and 20 (Figure 2) in such manner that the carriage may pass the support. This is accomplished by means of pivoted levers 110, one of which only is shown, which levers are provided at their lower ends with weights 111, and at their upper ends are each provided with a pair of forks, one for engaging the rod 10 and the other for engaging the rod 20. When the carriage arrives at one of these supports the lever is engaged thereby and tilted as indicated in Figure 2, and when the carriage has passed the lever, it resumes its normal position by virtue of the weight 111 which carries the lever again to vertical position.

The pipe is supported adjacent the lathe carriage by the pivoted arms 112 (Fig. 3) carrying at their upper ends the rollers 113. One set of these arms is mounted upon the carriage 5 to move just in advance of the winding, and other sets may be used along the pipe as desired. The arms are adjustably held in position by means of the screw rods 114 swiveled at their upper ends in the pivoted blocks 115, and threaded at their lower ends into pivoted blocks 116 mounted on the carriage 5.

When it is desired to use the machine for making a screen in which the wire is not lugged, the punching roll 51 is removed and the block 95' shown in Figure 6ª is substituted for the block 95 shown in Figure 6. This block 95' differs from the block 95 in that it is provided with a roll 117 carrying a plurality of blades 118 in place of the shoe or block 97 used with the other form of device. The blades or disks 118 fit down between the coils of wire previously wound, and press such coils laterally in the same manner that the shoe or block 97 of the other form of device presses the last coil of wire laterally. By the use of this device, the coils are accurately spaced even where no lugs are provided.

In Figures 11 and 12 an alternative form of driving mechanism for the punching roll 51' is diagrammatically shown. In this instance the shaft 50' corresponding to the shaft 50 in the other form of device is driven directly from the pipe by means of the collar 120 fitting upon the pipe and provided with sprocket teeth. This kind of a drive is designed to be used in cases where a ribbed pipe, such as that shown in the drawings, is used. The collar fits the pipe with its ridges and is advanced longitudinally thereover as the winding progresses, by means of the member 121 which engages the side of the collar, and is itself carried by a plate corresponding to the plate 42 in the other form of device. A chain 122 passes from the sprocket-sleeve 120 to the sprocket wheel 122', which sprocket-wheel is carried by the counter-shaft 123 which drives the shaft 50' by means of the engaging spur gears 124 and 125. An idler 126 is used to maintain the proper tension in the chain. The gear 125 drives the shaft 51' in the same manner that the sprocket 57 drives the shaft 50.

Having thus described our invention and illustrated its use, what we claim as new and desire to secure by Letters Patent is the following:—

1. A machine for forming wire screening surfaces upon supporting pipes, comprising means for rotating a pipe about its axis, a device movable longitudinally of the pipe for guiding the wire onto the pipe, and a spring held member mounted on the device for yieldingly engaging the sides of the coils of wire.

2. A machine for forming wire screening surfaces upon supporting pipes, comprising means for rotating a pipe about its axis, a device movable longitudinally of the pipe for guiding the wire onto the pipe, and a laterally spring-held shoe adapted to engage the side of the last wound coil of wire.

3. A machine for forming wire screening surfaces upon supporting pipes, comprising means for rotating a pipe about its axis, a device movable longitudinally of the pipe for guiding the wire onto the pipe, means for providing the wire with spacing members mounted on the device, and a laterally spring-held shoe adapted to engage the side of the last wound coil of wire to press its spacing members against the preceding coil of wire.

4. A machine for forming wire screening surfaces upon supporting pipes, comprising means for rotating a pipe about its axis, a device movable longitudinally of the pipe for guiding the wire onto the pipe, a laterally spring held wire engaging means mounted upon the device, and adjusting means for varying the pressure of the spring held engaging means upon the wire.

5. A machine for forming wire screening surfaces upon supporting pipes, comprising means for rotating a pipe about its axis, a device movable longitudinally of the pipe for guiding the wire onto the pipe, and a laterally spring-held shoe member adapted to rest on the surface of the pipe and engage the last turn of wire with a yielding pressure.

6. A machine for forming wire screening surfaces upon supporting pipes, comprising means for rotating a pipe about its axis, a device movable longitudinally of the pipe for guiding the wire onto the pipe, an adjustable spring-held member to press against the sides of the coils of wire, and an indicator for the spring.

7. A machine for forming wire screening surfaces upon supporting pipes, comprising means for rotating a pipe about its axis, a device movable longitudinally of the pipe for guiding the wire onto the pipe, and an adjustable spring-held wire engaging means mounted for parallel movement and adapted to press against the sides of the coils of wire.

8. A machine for forming wire screening surfaces upon supporting pipes, comprising means for rotating a pipe about its axis, a device movable longitudinally of the pipe for guiding the wire onto the pipe, an adjustable spring-held wire engaging means adapted to press against the sides of the coils of wire, and a roller mounted on the device adjacent the engaging means and adapted to press upon the top of the wire as it passes upon the pipe.

9. A machine for forming wire screening surfaces upon supporting pipes, comprising means for rotating a pipe about its axis, means for providing the wire with spacing members as it passes to the pipe, and means for reducing the members thus formed to the exact height desired.

10. A machine for forming wire screening surfaces upon supporting pipes, comprising means for rotating a pipe about its axis, means for punching spacing spurs on the wire, and a cutter for reducing the spurs thus formed to a predetermined height.

11. A machine for forming wire screening surfaces upon supporting pipes, comprising means for rotating a pipe about its axis, a carriage movable longitudinally of the pipe, means for providing the wire with spacing members mounted on the carriage, and other means mounted on the carriage in the line of travel of the wire for cutting the members to a predetermined height.

12. A machine for forming wire screening surfaces upon supporting pipes, comprising means for rotating the pipe about its axis, a device movable longitudinally of the pipe for guiding the wire onto the pipe, a feed screw for advancing the device along the pipe, and spring held means mounted on the device for yieldingly engaging the sides of the previously wound turns of wire.

13. A machine for forming wire screening surfaces upon supporting pipes, comprising means for rotating a pipe about its axis, a frame movable longitudinally of the pipe for carrying the wire as it is fed to the pipe, mechanism on the frame whereby spacing members are formed on the wire, and means for operating the said mechanism in such timed relation to the rotation of the pipe that the said members are substantially longitudinally alined on the completed screen.

14. A machine for forming wire screening surfaces upon supporting pipes, comprising means for rotating a pipe about its axis, a frame movable longitudinally of the pipe for carrying the wire as it is fed to the pipe, mechanism on the frame whereby spacing members are formed on the wire, and means for operating the said mechanism in such timed relation to the rotation of the pipe that the said members are substantially longitudinally alined on the completed screen, and means on the frame for pressing the successive coils laterally into engagement.

15. A machine for forming wire screening surfaces upon supporting pipes, comprising means for rotating a pipe about its axis, a frame movable longitudinally of the pipe for carrying the wire as it is fed to the pipe, means on the frame for punching spurs on the wire as it is fed to the pipe, and operating means for the punching means arranged to punch an even number of spurs for each rotation of the pipe.

16. A machine for forming wire screening surfaces upon supporting pipes, comprising means for rotating a pipe about its axis, a frame movable longitudinally of the pipe for carrying the wire as it is fed to the pipe, a wheel provided with a plurality of spaced punching members mounted on the frame in position to form spacing spurs on the wire as it is fed to the pipe, and drive means for the wheel geared to turn with the pipe.

17. A machine for forming wire screening surfaces upon supporting pipes, comprising means for rotating a pipe about its axis, a frame movable longitudinally of the pipe for carrying the wire as it is fed to the pipe, a wheel provided with a plurality of spaced punching members mounted on the frame in position to form spacing spurs on the wire as it is fed to the pipe, and drive means for the wheel geared to turn with the pipe, the punching spurs being spaced apart a distance which is approximately an exact divisor of the circumference of the completed screen, whereby the spurs are arranged in alined rows upon such completed screen.

18. A machine for forming wire screening surfaces upon supporting pipes, comprising means for rotating a pipe about its axis, means for guiding the wire onto the pipe, a member provided with means for punching spacing spurs on the wire, and drive means for the member geared to turn with the pipe, the speed of drive of the parts and the arrangement of the punching means being such that the distance apart of the spurs punched is approximately an exact divisor of the circumference of the completed screen, whereby the spurs are arranged in alined rows upon such completed screen.

19. A machine for forming wire screening surfaces upon supporting pipes, comprising means for rotating a pipe about its axis, means for guiding the wire onto the pipe, a member capable of a limited rotative movement with respect to its drive but yieldingly held in normal position and provided with means for punching spacing spurs on the wire, and drive means for the member whereby its punching means has approximately the same speed of rotation as the periphery of the pipe.

20. In a screen forming machine, wire punching means for the wire, comprising a rotatively mounted punch, and spring held driving means therefor whereby the punch has limited relative movement independent of its drive to compensate for variations of speed in the wire being drawn past the punch.

21. In a screen forming machine, wire punching means for the wire, comprising a rotatively mounted punch, and driving means therefor comprising a shaft for the punch provided with a recess in its side, and a driving member for the shaft provided with a spring held movable tapering key engaging the said recess.

22. In a machine for forming wire screening surfaces upon supporting pipes, means for rotating a pipe about its axis, a carriage movable longitudinally of the pipe, a wire guiding device slidably mounted on the carriage and provided with an adjusting screw, and a nut carried by the carriage in engagement with the screw whereby the guiding device may be adjusted longitudinally of the pipe and the carriage.

23. In a machine for forming wire screening surfaces upon supporting pipes, means for rotating a pipe about its axis, a carriage movable longitudinally of the pipe, a feed screw for moving the carriage, wire guiding means slidably mounted on the carriage for adjustment longitudinally of the pipe, and operating means for moving the guiding means.

24. In a machine for forming wire screening surfaces upon supporting pipes, means for rotating a pipe about its axis, a carriage movable longitudinally of the pipe, a feed screw for moving the carriage, wire guiding means slidably mounted on the carriage for adjustment longitudinally of the pipe, and a screw and nut for moving the wire guiding means on the carriage.

25. In a machine for forming wire screening surfaces upon supporting pipes, means for rotating a pipe about its axis, a carriage movable longitudinally of the pipe, wire guiding means pivoted on the carriage for movement transverse to the axis of the pipe, and an operating worm for holding the guiding means in adjusted position.

26. In a machine for forming wire screening surfaces upon supporting pipes, means for rotating a pipe about its axis, a carriage movable longitudinally of the pipe, a feed screw for moving the carriage, wire guiding means mounted on the carriage for movement with respect to the carriage both longitudinally of the axis of the pipe and transversely thereof, and securing means for holding the guiding means in its adjusted position on the carriage.

27. In a machine for forming wire screening surfaces upon supporting pipes, means for rotating a pipe about its axis, a carriage movable longitudinally of the pipe, a feed screw for moving the carriage, a frame slidably mounted on the carriage for adjustment longitudinally of the pipe, wire guiding means mounted on the frame, a rotatable shaft carrying at one end a punching member and at the other end having slidably keyed thereon a drive gear also mounted in the frame, an operating rod parallel to the feed screw and carrying slidably keyed thereon an operating gear, and driving connections between the operating gear and the drive gear.

28. In a machine for forming wire screening surfaces upon supporting pipes, means for rotating a pipe about its axis, a carriage movable longitudinally of the pipe, a feed screw for moving the carriage, a frame mounted on the carriage, wire guiding means on the carriage, a rotatable shaft mounted in the frame and carrying at one end a punching member and at the other end a drive gear, an operating rod parallel to the feed screw, an operating gear slidably keyed thereon, and driving connections between the operating gear and the drive gear.

29. In a machine for forming wire screening surfaces upon supporting pipes, means for rotating a pipe about its axis, a carriage movable longitudinally of the pipe, wire guiding means and spur punching means on the carriage, an operating rod extending along the path of travel of the carriage, a gear slidingly keyed to the rod and having connections for driving the punching means, and steadying means for the rod comprising a pivoted member with a forked end for engaging the rod yieldingly held in engaging position whereby it may be moved out of the way to permit the carriage to pass and automatically return to normal position.

30. In a machine for forming wire screening surfaces upon supporting pipes, means for rotating a pipe about its axis, a carriage movable longitudinally of the pipe, wire guiding means and spur punching means on the carriage, an operating rod extending along the path of travel of the carriage, a gear slidingly keyed to the rod and having connections for driving the punching means, and steadying means for the rod comprising a pivoted member with a forked upper end for engagement with the rod and a weighted lower end for normally holding the forked end in engagement with the rod.

31. In a machine for forming wire screening surfaces upon supporting pipes, means for rotating a pipe about its axis, a carriage movable longitudinally of the pipe, wire guiding means and spur punching means, an operating rod extending along the path of travel of the carriage, a gear slidingly keyed to the rod and having connections for driving the punching means, and steadying means for the rod comprising a member pivoted intermediate its ends to swing in a vertical plane parallel to the direction of movement of the carriage and having a forked upper end for engagement with the rod and a weighted lower end for normally holding the forked end in engagement with the rod.

32. The combination in lathe mechanism, of a longitudinally movable carriage, a feed screw therefor, operating means on the carriage, an operating rod extending along the path of travel of the carriage, a gear slidingly keyed to the rod and having connections for driving the operating means, and steady means for the shaft comprising a pivoted counterweighted lever having a forked upper end for engaging the rod.

33. In a wire winding machine, means for rotating a member for receiving the wire, a driving clutch for operating the said means, shifting means therefor, a movable reel frame having a lost motion connection to the shifting means, and yielding means for normally holding the reel in such position that the clutch is in driving engagement.

34. Mechanism for forming screening wire with spacing members of uniform size comprising mechanism for deforming the wire at intervals to secure the provision of spacing members of approximately the desired height, and means for reducing the members thus formed to the exact height required.

In testimony whereof we have hereunto signed our names in the presence of the two subscribed witnesses.

RICHARD F. KREITER.
ERNEST S. POST.
ALBERT L. ROCO.
MAHLON E. LAYNE.

Witnesses:
  H. MALSCH,
  JNO. ILFREY.